US012344819B2

(12) United States Patent
Snow

(10) Patent No.: US 12,344,819 B2
(45) Date of Patent: Jul. 1, 2025

(54) LIQUID FABRIC SOFTENING COMPOSITION

(71) Applicant: Church & Dwight Co., Inc., Princeton, NJ (US)

(72) Inventor: Courtney Snow, Blackwood, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 319 days.

(21) Appl. No.: 17/761,474

(22) PCT Filed: Sep. 25, 2020

(86) PCT No.: PCT/IB2020/059007
§ 371 (c)(1),
(2) Date: Mar. 17, 2022

(87) PCT Pub. No.: WO2021/059236
PCT Pub. Date: Apr. 1, 2021

(65) Prior Publication Data

US 2022/0348845 A1 Nov. 3, 2022

Related U.S. Application Data

(60) Provisional application No. 62/907,187, filed on Sep. 27, 2019.

(51) Int. Cl.
*C11D 3/00* (2006.01)
*C11D 3/30* (2006.01)
*C11D 3/37* (2006.01)
*C11D 11/00* (2006.01)

(52) U.S. Cl.
CPC .............. *C11D 3/0015* (2013.01); *C11D 3/30* (2013.01); *C11D 3/3723* (2013.01); *C11D 3/3773* (2013.01); *C11D 2111/12* (2024.01)

(58) Field of Classification Search
CPC ...... C11D 3/0015; C11D 11/0017; C11D 3/30
See application file for complete search history.

(56) References Cited

U.S. PATENT DOCUMENTS 5,460,736 A * 10/1995 Trinh .................. C11D 3/3776 510/516
6,949,500 B2 9/2005 Salesses et al.
7,452,854 B2 11/2008 Green et al.
8,238,306 B2 * 8/2012 Yokota ................ H04W 36/305 370/252
8,283,306 B2 10/2012 Guyot et al.
8,563,498 B2 10/2013 Gizaw et al.
8,728,172 B2 5/2014 Corona, III et al.
9,428,714 B2 8/2016 Zander
2004/0023830 A1 2/2004 Frankenbach
2006/0058214 A1 3/2006 Zhang et al.
2011/0177994 A1 * 7/2011 Wahl .................... C11D 3/3723 510/516
2015/0141315 A1 5/2015 Jin
2016/0184196 A1 * 6/2016 Baxter ..................... A61Q 5/10 424/401
2016/0369207 A1 12/2016 Westervelt
2017/0044468 A1 * 2/2017 Gori ......................... C11D 3/26
2017/0191002 A1 7/2017 Dykstra et al.
2017/0211018 A1 7/2017 Dykstra et al.
2017/0211019 A1 7/2017 Sivik et al.
2017/0247637 A1 8/2017 Dykstra et al.
2017/0273892 A1 9/2017 Cox et al.
2017/0298295 A1 10/2017 Dykstra et al.
2017/0342345 A1 11/2017 Sivik et al.
2018/0094213 A1 * 4/2018 Schymitzek ........... C11D 3/001
2018/0195024 A1 7/2018 Piorkowski
2019/0161707 A1 * 5/2019 Vejborg ............. C11D 3/38618
2019/0231658 A1 * 8/2019 Lei ........................... A61K 8/41
2020/0224124 A1 * 7/2020 Bautista Cid ............ C11D 3/30
2020/0255568 A1 * 8/2020 Hsu ......................... C08F 2/001
2021/0237021 A1 * 8/2021 Akeroyd .................. B01J 13/14
2022/0348845 A1 * 11/2022 Snow ................... C11D 3/3773

FOREIGN PATENT DOCUMENTS

CA 2348551 C 12/2009
CA 2952987 A1 1/2016
CA 2920316 A1 4/2016
DE 102017125560 A1 * 5/2019 ............... C11D 1/62
EP 0978556 B1 10/2004
EP 1399533 B1 5/2007
EP 1607469 B1 2/2008
EP 1981959 B1 9/2010
EP 2029712 B1 12/2016
EP 2861706 B1 12/2017

(Continued)

*Primary Examiner* — Peter F Godenschwager
*Assistant Examiner* — M. Reza Asdjodi
(74) *Attorney, Agent, or Firm* — Church & Dwight Co., Inc.

(57) ABSTRACT

The present disclosure provides compositions for use as in-rinse softeners for textiles. The compositions can be in the form of liquid fabric softeners that can be configured to substantially avoid build-up on treated fabrics. In particular, the compositions can comprise predominately water and at least a conditioning agent, such as a polymeric quaternary ammonium salt, that will provide conditioning and softening effects to a treated fabric without leaving behind undesired build-up. The compositions optionally may include further components, such as anti-static agents, chlorine scavengers, preservatives, and acidifying agents.

14 Claims, No Drawings

(56) References Cited

FOREIGN PATENT DOCUMENTS

| | | | | |
|---|---|---|---|---|
| EP | 3327106 | A1 | 5/2018 | |
| EP | 3172301 | B1 | 1/2019 | |
| WO | WO03/106606 | A3 | 4/2004 | |
| WO | WO-2015166075 | A1 * | 11/2015 | ......... C11D 11/0023 |
| WO | WO2017/111323 | A1 | 6/2017 | |
| WO | WO2018/007201 | A1 | 1/2018 | |
| WO | WO2018/108466 | A1 | 6/2018 | |
| WO | WO 2019/014086 | | 1/2019 | |
| WO | WO 2019/070838 | | 4/2019 | |
| WO | WO 2019/117902 | | 6/2019 | |

* cited by examiner

LIQUID FABRIC SOFTENING COMPOSITION

CROSS-REFERENCE TO RELATED APPLICATIONS

The present application is a U.S. National Stage of International Patent Application PCT/IB2020/059007, filed Sep. 25, 2020, and claims priority to U.S. Provisional Patent Application No. 62/907,187, filed Sep. 27, 2019. The disclosures of each of the applications noted above are incorporated herein by reference in their entirety.

FIELD OF THE DISCLOSURE

The present disclosure relates to compositions for improving fabric softness. More specifically, the compositions can provide fabric softening during in-rinse use.

BACKGROUND

Various different compositions have been proposed for improving softness of textiles, particularly clothing and other fabrics intended for prolonged bodily contact. Aqueous compositions in particular are known for use during laundering and specifically can be provide as an "in-rinse" formulation for addition during a rinse cycle of a laundering process. Softening agents utilized for rinse-added fabric softener compositions often include ester-quaternary compounds. While such compounds have been found to be effective softening agents, they also can provide an undesirable build-up on a fabric surface over time. Such build-up of the softening agent can reduce water absorption of the underlying fabric, which in turn increases drying time. This can be particularly undesirable in relation to specialty fabrics, such as activewear clothing lines that are designed to provide rapid wicking of liquid away from the body and that thus require rapid drying. Moisture-wicking activewear typically is designed to draw sweat away from the body through the fabric so that the sweat is rapidly wicked away for evaporation; however, the build-up caused by typical fabric softeners can clog the weaves of the fabric and substantially prevent sweat from being wicked away at the surface. Accordingly, there remains a need in the field for further compositions suitable for providing fabric softening effects without unwanted build-up of chemical residues on the fabric surface.

SUMMARY OF THE DISCLOSURE

The present disclosure provides compositions that are adapted to or configured to provide softening to textiles, more particularly fabrics, such as clothing. The softening compositions may be suitable for a variety of applications but may be particularly suitable for use as a rinse-added composition during laundering of clothing. As such, the present compositions may be characterized as being in-rinse formulations or rinse-added formulations.

In one or more embodiments, the present disclosure can provide a liquid fabric softening composition comprising: a conditioning agent in an amount of about 0.1% to about 1.5% by weight based on the total weight of the composition, wherein the condition agent includes at least a polymeric quaternary ammonium salt; and water in an amount of about 90% or greater by weight based on the total weight of the composition. In further embodiments, the liquid fabric softening composition may be characterized in relation to one or more of the following statements, which may be combined in any number and order.

The conditioning agent can include at least a polyquaternium material.

The conditioning agent can be present in an amount of about 0.4% to about 1.2% by weight based on the total weight of the composition.

The water can be present in an amount of about 96% to about 99.5% by weight based on the total weight of the composition.

The liquid fabric softening composition can further comprise an anti-static agent including at least a non-polymeric quaternary ammonium salt.

The at least non-polymeric quaternary ammonium salt can be laurtrimonium chloride.

The anti-static agent can be present in an amount of about 0.6% to about 3% by weight based on the total weight of the composition.

The liquid fabric softening composition can further comprise a chlorine scavenger.

The chlorine scavenger can be a polyethyleneimine.

The chlorine scavenger can be present in an amount of about 0.1% to about 0.3% by weight based on the total weight of the composition.

The liquid fabric softening composition further can comprise an acidifying agent.

The acidifying agent can be present in an amount of about 0.1% to about 0.8% by weight based on the total weight of the composition.

The liquid fabric softening composition can further comprise one or more preservatives.

The one or more preservatives can be present in a total amount of about 0.003% to about 0.008% by weight based on the total weight of the composition.

The liquid fabric softening composition can exclude conditioning agents that are not polymeric quaternary ammonium salts.

The conditioning agent can be polyquaternium-37.

In some embodiments, a liquid fabric softening composition specifically can consist essentially of: one or more polymeric quaternary ammonium salt conditioning agents; one or more acidifying agents; one or more preservatives; optionally one or more scents; and water.

These and other features, aspects, and advantages of the disclosure will be apparent from a reading of the following detailed description. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

DETAILED DESCRIPTION OF THE DISCLOSURE

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein;

rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to fabric softening compositions that are suitable for use with a wide variety of textiles. The present compositions are particularly beneficial in that they can provide highly effective softening while requiring only a relatively small quantity of softening agents. Moreover, the softening agents that are utilized can significantly reduce or even eliminate unwanted build-up of residue on fabrics that can limit useful attributes of the fabrics, such as effective wicking and rapid drying ability.

In one or more embodiments, the present disclosure can provide an in-rinse or rinse-added, liquid fabric softening composition that beneficially can be safe for use on substantially all fabrics, including those that typically include warnings against the use of fabric softeners, such as activewear and delicates. The present disclosure arises at least in part from the recognition that limiting a fabric softening composition to a relatively small group of softening agents can be beneficial provide for softening that is effective and safe for use with a wide range of textiles. The softening agents utilized according to the present disclosure thus have been specifically identified as being set apart from many known softening agents in that they can provide effective softening ability without the undesired effect of leaving a chemical residue or build-up on the fabric that can be waxy and/or induce a level of hydrophobicity to the fabric that can limit desired properties, such as wicking and rapid drying.

In some embodiments, the present softening composition can utilize a polymeric quaternary ammonium salt as a softening agent or a conditioning agent. The term "conditioning agent" is particularly suitable since polymeric quaternary ammonium salts have previously been recognized as useful as conditioners in personal care products, such as lightweight hair conditioners. Such polymeric quaternary ammonium salts thus can be beneficial according to the present disclosure to provide an in-rinse formulation that provides conditioning effects to the fabrics to which they are applied without leaving an undesired build-up as described above. Instead, excess softening agent is rinsed away, and the treated fabric is left with a conditioned effect with substantially no residue or build-up.

The conditioning agent can particularly be a cationic polymer. Alternatively, or additionally, the conditioning agent can particularly be a hydrophilic polymer. In certain embodiments, a polymeric quaternary ammonium salt that is utilized as the conditioning agent can include one or more polyquaternium polymers. Polyquaternium polymers are polycationic polymers having the "polyquaternium" designation as approved by the International Nomenclature for Cosmetic Ingredients (INCI). The term polyquaternium can emphasize the presence of the quaternary ammonium centers in the various polymers. In certain embodiments, polyquaternium-37, also called poly(2-methacryloxyethyltrimethylammonium chloride), may particularly be used as a softening agent, as a non-limiting example.

The present compositions can include one or more conditioning agents in a total concentration of up to about 1.5% by weight based on the total weight of the composition. Thus, the fabric softening composition can comprise at least an effective amount of the one or more conditioning agents, but the one or more conditioning agents may be present in an amount of less than 2% by weight, less than 1.5% by weight, or less than 1% by weight based on the total weight of the composition. In some embodiments, the one or more conditioning agents may be present in a total amount of about 0.1% to about 1.5%, about 0.2% to about 1.4%, about 0.3% to about 1.3%, about 0.4% to about 1.2% or about 0.5% to about 0.8% by weight, based on the total weight of the fabric softening composition.

In some embodiments, the presently disclosed composition can be defined in relation to the specific exclusion of softening agents that would be expected to provide adverse effects, such as leading to undesired build-up on treated fabrics. For example, in some embodiments, the present compositions can expressly exclude any known softening agent that is not a polymeric quaternary ammonium salt. In some embodiments, the present compositions can expressly exclude any known softening agent that is not a polyquaternium. In some embodiments, the present compositions can expressly exclude any known softening agent that is not polyquaternium-37. More particularly, the present compositions may exclude ester quaternary compounds that are typically utilized as softening agents in liquid fabric softeners. For example, compounds such as diethyl ester dimethyl ammonium chloride and dehydrogenated palmoylethyl hydroxyethylmonium methosulfate may be excluded. Accordingly, in some embodiments, the presently disclosed compositions may be referenced as including a conditioning agent that consists essentially of a polymeric quaternary ammonium salt or that consists essentially of a polyquaternium.

In addition to the conditioning agent, the present compositions can include one or more further components as desired. For example, in some embodiments, it can be desirable to include one or more of an anti-static agent, a chlorine scavenger, a preservative, a pH adjuster, and a fragrance. Preferably, any such further component that may be combined with the conditioning agent in the fabric softening composition will not substantially cause build-up on treated fabrics.

In particular embodiments, non-polymeric quaternary ammonium salts can be used as an anti-static agent. Laurtrimonium chloride is a non-limiting example of non-polymeric quaternary ammonium salts that may be useful as an anti-static agent. Centrimonium chloride is a further non-limiting example. In some embodiments, an anti-static agent can be present in an amount of 0% to 5% by weight based on the total weight of the fabric softening composition. More particularly, when present, the anti-static agent may be added in a total amount of about 0.1% to about 5%, about 0.2% to about 4.5%, about 0.5% to about 4%, or about 0.6% to about 3% by weight based on the total weight of the composition. In some embodiments, an anti-static agent may be expressly excluded.

In some embodiments, chlorine scavengers that may be used in the present compositions include any material that is adapted to or configured to react with chlorine, or with chlorine-generating materials, such as hypochlorite, to eliminate or reduce the activity of the chlorine materials. Again, the chlorine scavenger preferably is a material that will not substantially cause build-up on treated fabrics. In a non-limiting example, polyethyleneimine can be used as a chlorine scavenger, although other amine functional polymers and other known chlorine scavengers may additional or alternatively be utilized. In some embodiments, a chlorine scavenger can be present in an amount of 0% to 1% by weight based on the total weight of the fabric softening composition. More particularly, when present, the chlorine scavenger may be added in a total amount of about 0.01% to about 1%, about 0.05% to about 0.8%, about 0.08% to about 0.5%, or about 0.1% to about 0.3% by weight based on the total weight of the composition. In some embodiments, a chlorine scavenger may be expressly excluded.

Any preservative suitable for use in a fabric softening composition may be utilized according to the present disclosure. As non-limiting examples, 1,2-benzisothiazolin-3-one and/or 2-methyl-4-isothiazolin-3-one may be used. In some embodiments, a preservative can be present in an amount of 0% to about 0.1% by weight based on the total weight of the fabric softening composition. More particularly, when present, the preservative may be added in a total amount of about 0.001% to about 0.1%, about 0.002% to about 0.05%, or about 0.003% to about 0.008% by weight based on the total weight of the composition. In some embodiments, a preservative may be expressly excluded.

The present fabric softening compositions preferably are provided with a substantially acidic pH. Preferably, in some embodiments, pH of the fabric softening composition can be less than 7, less than 6.5, less than 6, or less than 5.5 (e.g., it being understood that the bottom range of the pH may be greater than 0). In particular, pH may be in the range of about 3.0 to about 6.0, about 3.5 to about 5.5, about 3.5 to about 5.0, or about 4.0 to about 4.5. As the conditioning agent and/or further components of the composition may tend to increase composition pH, it can be useful to include a suitable amount of an acidifying agent (i.e., an acidic pH adjuster) in order to achieve the desired pH level. In some embodiments, an organic acid, such as citric acid, may be utilized as the pH adjuster. In some embodiments, a pH adjuster can be present in an amount of 0% to 1.5% by weight based on the total weight of the fabric softening composition. More particularly, when present, the pH adjuster may be added in a total amount of about 0.01% to about 1.5%, about 0.05% to about 1.2%, or about 0.1% to about 0.8% by weight based on the total weight of the composition. In some embodiments, a pH adjuster may be expressly excluded.

In one or more embodiments, the presently disclosed fabric composition can be formed predominately from water. Beneficially, the present compositions are effective to provide the desired conditioning effect to a wide variety of textiles without the need to incorporate a substantially large concentration of chemical additives. As such, the present compositions can be formed of about 90% or greater, about 92% or greater, about 95% or greater, or about 98% or greater of water, based on the total weight of the composition, with the composition having a maximum of 99.9% by weight water. More particularly, the fabric softening compositions can comprise about 90% to about 99.9%, about 92% to about 99.8%, about 95% to about 99.7%, or about 96% to about 99.5% by weight water based on the total weight of the composition.

In some embodiments, the presently disclosed compositions may be characterized in relation to one or more physical properties of the composition. For example, the compositions may be substantially clear or transparent. Transparency, for example, may be evaluated utilizing known methods, such as ASTM E2680. Alternatively, or additionally, transparency or clarity may be evaluated by measuring transmittance through a sample of the composition utilizing a UV-Vis spectrophotometer.

The present fabric softening compositions may include any combination of materials described herein. Preferably, the composition includes at least a conditioning agent as provided above and water. The present compositions thus can be surprisingly effective as fabric softening compositions despite the relative simplicity of the formulation thereof. As non-limiting examples, the present compositions thus may be defined in relation to any of the following embodiments.

A liquid fabric softening composition according to the present disclosure can include a conditioning agent that consists essentially of a polymeric quaternary ammonium salt.

A liquid fabric softening composition according to the present disclosure can include a conditioning agent that consists of a polymeric quaternary ammonium salt.

A liquid fabric softening composition according to the present disclosure can include a conditioning agent that consists essentially of a polyquaternium material.

A liquid fabric softening composition according to the present disclosure can include a conditioning agent that consists of a polyquaternium material.

A liquid fabric softening composition according to the present disclosure can consist essentially of: water; one or more polymeric quaternary ammonium salts; and one or more preservatives.

A liquid fabric softening composition according to the present disclosure can consist essentially of: water; one or more polymeric quaternary ammonium salts; one or more acidifying agents; and one or more preservatives.

A liquid fabric softening composition according to the present disclosure can consist essentially of: water; one or more polymeric quaternary ammonium salts; one or more anti-static agents; and one or more preservatives.

A liquid fabric softening composition according to the present disclosure can consist essentially of: water; one or more polymeric quaternary ammonium salts; one or more anti-static agents; one or more acidifying agents; and one or more preservatives.

A liquid fabric softening composition according to the present disclosure can consist essentially of: water; one or more polymeric quaternary ammonium salts; one or more chlorine scavengers; and one or more preservatives.

A liquid fabric softening composition according to the present disclosure can consist essentially of: water; one or more polymeric quaternary ammonium salts; one or more chlorine scavengers; one or more acidifying agents; and one or more preservatives.

A liquid fabric softening composition according to the present disclosure can consist essentially of: water; one or more polymeric quaternary ammonium salts; one or more anti-static agents; one or more chlorine scavengers; and one or more preservatives.

A liquid fabric softening composition according to the present disclosure can consist essentially of: water; one or more polymeric quaternary ammonium salts; one or more anti-static agents; one or more chlorine scavengers; one or more acidifying agents; and one or more preservatives.

A liquid fabric softening composition according to the present disclosure can consist of: water; one or more polymeric quaternary ammonium salts; optionally one or more anti-static agents; optionally one or more chlorine scavengers; optionally one or more acidifying agents; optionally one or more fragrances; and optionally one or more preservatives.

A liquid fabric softening composition according to the present disclosure can consist essentially of: water; one or more polyquaternium conditioning agents; and one or more preservatives.

A liquid fabric softening composition according to the present disclosure can consist essentially of: water; one or more more polyquaternium conditioning agents; one or more acidifying agents; and one or more preservatives.

A liquid fabric softening composition according to the present disclosure can consist essentially of: water; one or more polyquaternium conditioning agents; one or more anti-static agents; and one or more preservatives.

A liquid fabric softening composition according to the present disclosure can consist essentially of: water; one or more polyquaternium conditioning agents; one or more anti-static agents; one or more acidifying agents; and one or more preservatives.

A liquid fabric softening composition according to the present disclosure can consist essentially of: water; one or more polyquaternium conditioning agents; one or more chlorine scavengers; and one or more preservatives.

A liquid fabric softening composition according to the present disclosure can consist essentially of: water; one or more polyquaternium conditioning agents; one or more chlorine scavengers; one or more acidifying agents; and one or more preservatives.

A liquid fabric softening composition according to the present disclosure can consist essentially of: water; one or more polyquaternium conditioning agents; one or more anti-static agents; one or more chlorine scavengers; and one or more preservatives.

A liquid fabric softening composition according to the present disclosure can consist essentially of: water; one or more polyquaternium conditioning agents; one or more anti-static agents; one or more chlorine scavengers; one or more acidifying agents; and one or more preservatives.

A liquid fabric softening composition according to the present disclosure can consist of: water; one or more polyquaternium conditioning agents; optionally one or more anti-static agents; optionally one or more chlorine scavengers; optionally one or more fragrances; optionally one or more acidifying agents; and optionally one or more preservatives.

EXPERIMENTAL

Example 1

Various samples of liquid fabric softener compositions were evaluated to compare their softening and static reduction performance per ASTM Method D5237 and their re-wetting capabilities per CSPA DCC-13D. All samples were prepared for testing by being machine washed five times, twice with detergent and three times without detergent. Washing was carried out with a General Electric brand washer Model GTW330ASK0WW with a warm water wash and a cold water rinse using tap water. Arm & Hammer Liquid Laundry Detergent in an amount of 46.04 g was used as the detergent for each load. After washing, the samples were dried once at a time in a General Electric brand dryer Model DDE-9200N using a normal cycle (60 minutes drying time). A designated amount of each test fabric softener was added to the corresponding rinse cycle in the amounts described below. The dryer was cleaned with alcohol before each use. Samples include fabric from sheets, pillowcases, terrycloth hand towels, and swatches of acrylic, acetate, nylon, polyester, and rayon. Sport shirts (Kohl's Men's Tek-Gear Core Performance Polyester Tee) were added to the loads for weight adjustment.

Eight total samples were tested. The Control was washed in detergent only with no fabric softener rinse. Comparative 1, Comparative 2, and Comparative 3 were washed using, as the fabric softener, Downy brand fabric softener (25.43 g), Hex Booster (29.49 g), and Lubrizol-Oleic (29.90 g), respectively. Experimental 1 used 29.55 g of a softener composition comprising 1.6% by weight polyquaternium-37 (PQ-37) and 10% by weight of a 30% solution of laurtrimonium chloride (LTC). Experimental 2 used 29.61 g of a softener composition comprising 1.6% by weight PQ-37 and 2% by weight of a 30% LTC solution. Experimental 3 used 29.58 g of a softener composition comprising 1.6% by weight PQ-37 and 5% by weight of a 30% LTC solution. Experimental 4 used 29.63 g of a softener composition comprising 1.6% by weight PQ-37, 2% by weight of a 30% LTC solution, and 1% by weight of FloSoft 222.

Static Reduction

After the dryer cycle was completed, the synthetic swatches were removed one at a time and hung on a wooden rack. Static charge was measured on each quadrant and the center of the swatch with a Simco Electrostatic Locator SS-2X at a distance of two inches. During these measurements the humidity was measured with a hygrometer. For all the tests the relative humidity was 28-32%, and the room temperature was 70-74° F. Fifty readings for the synthetic swatches in each wash load were totaled, and the percent static reduction was calculated using the formula $$\% \text{ Reduction}=100-(100X/Con)$$

wherein X is the sum of the static readings in a softened wash load and Con is the sum of the static readings in the control load (washing with the laundry detergent without addition of any fabric softener to the rinse cycle). The static reduction results are shown in Table 1.

Softness

The softened towels and sport shirts were arranged in pairs so that a towel/shirt treated with a given softener was paired three (3) times with towels/shirts treated with the other softener and the blank Ten (10) panel members judged each pair of towels and picked the softer in each pair. Every combination of two towels was therefore judged 30 times. The results were then tabulated and analyzed as described in Sensory Evaluation Techniques by Meilgaard, Civille and Carr, pp. 103-106. The result was a score for each product and the difference between the scores that is statistically significant at the 95% level of confidence. If the samples differed by this statistical difference they were deemed to be different. Higher scores indicated more softening. The softness results are shown in Table 1.

Re-Wet Properties

Towels and shirts from each wash load were cut into 2 inch by 5 inch strips. A 0.01% solution of Rhodamine Red in water was prepared, and the strips were immersed to a depth of 1 cm. After six minutes the strips were removed and the height of the dye above the immersion line in millimeters was measured. Four (4) replicates (from different towels) or each sample were cut and measured. The results of the re-wet testing are shown in Table 1.

TABLE 1

| | Synthetic Bundle | Terry Cotton Towel | | Polyester Moisture Wick Shirt | |
|---|---|---|---|---|---|
| Test Sample | Static % Reduction | Softness | Re-Wet (cm) | Softness | Re-Wet (cm) |
| Control | N/A | 231 | 7 | 210 | 12.3 |
| Comparative 1 | 87.70% | 316 | 6.2 | 310 | 8.4 |
| Comparative 2 | 68.70% | 276 | 8.7 | 297 | 12.1 |
| Comparative 3 | 24.50% | 394 | 4.7 | 396 | 9.9 |
| Experimental 1 | 79.50% | 374 | 9.2 | 304 | 10.9 |

TABLE 1-continued

| | Synthetic Bundle | Terry Cotton Towel | | Polyester Moisture Wick Shirt | |
|---|---|---|---|---|---|
| Test Sample | Static % Reduction | Softness | Re-Wet (cm) | Softness | Re-Wet (cm) |
| Experimental 2 | 28.40% | 315 | 8.2 | 313 | 11 |
| Experimental 3 | 53.10% | 265 | 8.1 | 326 | 10.8 |
| Experimental 4 | 67.90% | 349 | 8.8 | 364 | 11.3 |

Example 2

Various samples of liquid fabric softener compositions were evaluated to compare their softening and static reduction performance per ASTM Method D5237 and their re-wetting capabilities per CSPA DCC-13D. All samples were prepared for testing by being machine washed five times, twice with detergent and three times without detergent. Washing was carried out with a General Electric brand washer Model GTW330ASK0WW with a warm water wash and a cold water rinse using tap water. Arm & Hammer Liquid Laundry Detergent in an amount of 46.1 g was used as the detergent for each load. After washing, the samples were dried once at a time in a General Electric brand dryer Model DDE-9200N using a normal cycle (60 minutes drying time). A designated amount of each test fabric softener was added to the corresponding rinse cycle in the amounts described below. The dryer was cleaned with alcohol before each use. Samples included fabric from sheets, pillowcases, terrycloth hand towels, and swatches of acrylic, acetate, nylon, polyester, and rayon. Sport shirts (Kohl's Men's Tek-Gear Core Performance Polyester Tee) were added to the loads for weight adjustment.

Seven total samples were tested. The Control was washed in detergent only with no fabric softener rinse. Comparative 1 was washed using, as the fabric softener, Downy brand fabric softener (25.5 g). Experimental 1 used 29.6 g of a softener composition comprising 1.6% by weight polyquaternium-37 (PQ-37) and 10% by weight of a 30% solution of laurtrimonium chloride (LTC). Experimental 2 used 29.6 g of a softener composition comprising 1.6% by weight of PQ-37. Experimental 3 used 29.5 g of a softener composition comprising 1.86% by weight PQ-37 and 10% by weight of a 30% LTC solution. Experimental 4 used 29.5 g of a softener composition comprising 1.86% by weight PQ-37. Experimental 5 used 29.5 g of a softener composition comprising 1.86% by weight PQ-37 and 10% by weight of a 30% centrimonium chloride (CTC) solution.

Static Reduction

After the dryer cycle was completed, the synthetic swatches were removed one at a time and hung on a wooden rack. Static charge was measured on each quadrant and the center of the swatch with a Simco Electrostatic Locator SS-2X at a distance of two inches. During these measurements the humidity was measured with a hygrometer. For all the tests the relative humidity was 45-50%, and the room temperature was 73-77° F. Fifty readings for the synthetic swatches in each wash load were totaled, and the percent static reduction was calculated using the formula $$\% \text{ Reduction}=100-(100X/Con)$$

wherein X is the sum of the static readings in a softened wash load and Con is the sum of the static readings in the control load (washing with the laundry detergent without addition of any fabric softener to the rinse cycle). The static reduction results are shown in Table 2.

Softness

The softened towels were arranged in pairs so that a towel treated with a given softener was paired three (3) times with towels treated with the other softener and the blank. Ten (10) panel members judged each pair of towels and picked the softer in each pair. Every combination of two towels was therefore judged 30 times. The results were then tabulated and analyzed as described in Sensory Evaluation Techniques by Meilgaard, Civille and Carr, pp. 103-106. The result was a score for each product and the difference between the scores that is statistically significant at the 95% level of confidence. If the samples differed by this statistical difference they were deemed to be different. Higher scores indicated more softening. The softness results are shown in Table 2.

Re-Wet Properties

Four (4) towels from each wash load were cut into 2 inch by 5 inch strips. A 0.01% solution of Rhodamine Red in water was prepared, and the strips were immersed to a depth of 1 cm. After six minutes the strips were removed and the height of the dye above the immersion line in millimeters was measured. Four (4) replicates (from different towels) or each sample were cut and measured. The results of the re-wet testing are shown in Table 2.

TABLE 2

| | Synthetic Bundle | Terry Cotton Towel | |
|---|---|---|---|
| Test Sample | Static % Reduction | Softness | Re-Wet |
| Control | N/A | 197 | 8.8 |
| Comparative 1 | 89.6% | 358 | 6.3 |
| Experimental 1 | 93.4% | 269 | 10.0 |
| Experimental 2 | 27.5% | 228 | 9.8 |
| Experimental 3 | 77.7% | 317 | 7.3 |
| Experimental 4 | 54.2% | 222 | 9.9 |
| Experimental 5 | 93.5% | 299 | 6.8 |

Where various numerical values are modified herein with use of the word "about" it is understood that the values can mean the exact value stated. The stated value as modified by the word "about", however, can vary by a relatively small amount, such as +/−5%, +/−4%, +/−3%, +/−2%, or +/−1% of the exact value.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An in-rinse liquid fabric softening composition comprising:

a polymeric quaternary ammonium salt effective as a conditioning agent in an amount of about 0.4% to about 1.2% by weight based on the total weight of the composition, the polymeric quaternary ammonium salt being a polyquaternium material;

water in an amount of 96% to 99.5% by weight based on the total weight of the composition; and an anti-static agent in an amount of about 0.6% to about 3% by weight based on the total weight of the composition, the anti-static agent including at least a non-polymeric quaternary ammonium salt;

wherein the composition excludes ester quaternary compounds.

2. The in-rinse liquid fabric softening composition of claim 1, wherein the at least non-polymeric quaternary ammonium salt is laurtrimonium chloride.

3. The in-rinse liquid fabric softening composition of claim 1, further comprising a chlorine scavenger.

4. The in-rinse liquid fabric softening composition of claim 3, wherein the chlorine scavenger is a polyethyleneimine.

5. The in-rinse liquid fabric softening composition of claim 3, wherein the chlorine scavenger is present in an amount of about 0.1% to about 0.3% by weight based on the total weight of the composition.

6. The in-rinse liquid fabric softening composition of claim 1, further comprising an acidifying agent.

7. The in-rinse liquid fabric softening composition of claim 6, wherein the acidifying agent is present in an amount of about 0.1% to about 0.8% by weight based on the total weight of the composition.

8. The in-rinse liquid fabric softening composition of claim 1, further comprising one or more preservatives.

9. The in-rinse liquid fabric softening composition of claim 8, wherein the one or more preservatives are present in a total amount of about 0.003% to about 0.008% by weight based on the total weight of the composition.

10. The in-rinse liquid fabric softening composition of claim 1, wherein the composition excludes conditioning agents that are not polymeric quaternary ammonium salts.

11. The in-rinse liquid fabric softening composition of claim 1, wherein the conditioning agent is polyquaternium-37.

12. An in-rinse liquid fabric softening composition consisting essentially of:

one or more polymeric quaternary ammonium salt conditioning agents in an amount of about 0.4% to about 1.2% by weight based on the total weight of the composition, the one or more polymeric quaternary ammonium salt conditioning agents being one or more polyquaternium materials;

one or more acidifying agents;

one or more preservatives;

an anti-static agent in an amount of about 0.6% to about 3% by weight based on the total weight of the composition, the anti-static agent including at least a non-polymeric quaternary ammonium salt;

optionally one or more scents; and water in an amount of 96% to 99.5% by weight based on the total weight of the composition;

wherein the composition excludes ester quaternary compounds.

13. An in-rinse liquid fabric softening composition consisting of:

one or more polymeric quaternary ammonium salts effective as a conditioning agent in an amount of about 0.1% to about 1.5% by weight based on the total weight of the composition; and water in an amount of about 96% to 99.5% by weight based on the total weight of the composition;

wherein the composition excludes ester quaternary compounds.

14. The in-rinse liquid fabric softening composition according to claim 13, further comprising one or more components selected from the group consisting of chloring scavengers, acidifying agents, preservatives, and scents.

* * * * *